(12) United States Patent
Wind

(10) Patent No.: US 11,117,309 B2
(45) Date of Patent: Sep. 14, 2021

(54) DEVICE FOR CONTROLLING A RADIATION SOURCE FOR HARDENING LINING TUBES

(71) Applicant: SML VERWALTUNGS GMBH, Rohrbach (DE)

(72) Inventor: Herbert Wind, Albersweiler (DE)

(73) Assignee: SML VERWALTUNGS GMBH, Rohrbach (DE)

( * ) Notice: Subject to any disclaimer, the term of this patent is extended or adjusted under 35 U.S.C. 154(b) by 274 days.

(21) Appl. No.: 16/469,018

(22) PCT Filed: Dec. 12, 2017

(86) PCT No.: PCT/DE2017/101067
§ 371 (c)(1),
(2) Date: Jun. 12, 2019

(87) PCT Pub. No.: WO2018/108209
PCT Pub. Date: Jun. 21, 2018

(65) Prior Publication Data
US 2020/0016818 A1 Jan. 16, 2020

(30) Foreign Application Priority Data
Dec. 12, 2016 (DE) .......................... 102016124116.4

(51) Int. Cl.
| | | |
|---|---|---|
| *B29C 63/00* | (2006.01) |
| *F16L 58/00* | (2006.01) |
| *B29C 63/34* | (2006.01) |
| *F16L 58/12* | (2006.01) |
| *B29L 23/00* | (2006.01) |

(52) U.S. Cl.
CPC .......... *B29C 63/0004* (2013.01); *B29C 63/34* (2013.01); *F16L 58/12* (2013.01); *B29L 2023/22* (2013.01)

(58) Field of Classification Search
CPC ..... B29C 63/00; B29C 63/0004; B29C 63/30; B29C 63/34; F16L 58/00; F16L 58/10; F16L 58/12
See application file for complete search history.

(56) References Cited

FOREIGN PATENT DOCUMENTS

| | | |
|---|---|---|
| CN | 202929509 U | 5/2013 |
| EP | 2088837 A1 | 8/2009 |
| JP | 2001332712 A | 11/2001 |
| WO | WO-2008055366 A1 | 5/2008 |
| WO | WO-2014114572 A1 | 7/2014 |

*Primary Examiner* — Jacob T Minskey
*Assistant Examiner* — Matthew Hoover
(74) *Attorney, Agent, or Firm* — Harness, Dickey & Pierce, P.L.C.

(57) ABSTRACT

The invention relates to a device for hardening resin-impregnated lining tubes with high-energy radiation, comprising at least one radiation source for producing high-energy radiation and at least one power control device for regulating the electrical power output at the at least one radiation source, at least one nominal parameter representing the desired electrical power output of the power control device being adjustable or adjusted, and the actual power received from the at least one radiation source being measured by means of a measuring device and permanently compared with the nominal parameter, wherein in the event of falling short of the nominal parameter, the power control device increases the power output, and in the event of the nominal parameter being exceeded, the power output is reduced.

20 Claims, No Drawings

DEVICE FOR CONTROLLING A RADIATION SOURCE FOR HARDENING LINING TUBES

The present invention relates to a device for controlling a radiation source for curing lining tubes.

For inspection, maintenance and renovation of lines, duct systems, and the like, devices are often inserted into the lines in order to carry out the required measurement processes and/or mechanical renovation work. In order to measure the actual situation of a line, the devices usually comprise camera systems for visualizing the state of the line.

If a defect or damage is recognized, the corresponding section of the line system can be replaced by new sections. This is generally very laborious, however.

Alternatively, the prior art discloses methods in which, for renovation of line systems, e.g. ducts and similar pipe systems, a flexible, curable layer impregnated with curable resin, said layer being referred to as a lining tube or liner, is inserted into the line system. After being inserted, the lining tube is expanded, such that it nestles closely against the inner wall of the line system. The resin is subsequently cured.

The production of a lining tube of this type is described in WO 95/04646, for example. Curable resins used according to the known methods are preferably unsaturated polyester resins, vinyl ester resins or epoxy resins, which can be dissolved in styrene and/or an acrylic ester, for example.

Said unsaturated polyester- or vinyl esters can be cured thermally (usually using peroxide catalysts) or by means of radiation, e.g. using UV light with photoinitiators as described in EP-A 23623, for example. So-called combination curings with a peroxide initiator used for thermal curing in combination with photoinitiators are also possible and have proved to be advantageous particularly when the lining tubes have large wall thicknesses. One method for a so-called combination curing of this type is described in EP-A 1262708, for example.

A radiation-curing lining tube usually comprises a light-nontransmissive outer protective film, an inner film that is transmissive at least to specific wavelength ranges of electromagnetic radiation, and also a curable layer impregnated with a resin and arranged between the inner film and the outer film. The outer film tube is intended to prevent the resin used for impregnation from escaping from the curable layer and passing into the environment. This presupposes a good tightness and attachment of the outer film tube to the resin-impregnated curable layer.

A curing device is inserted into the lining tube for the curing thereof, said curing device comprising a radiation source and being led through the lining tube in order to activate or perform the curing of the curable layers of the lining tube by means of the radiation energy. A complete curing of the lining tubes is of great importance here, that is to say that a specific amount of radiation energy has to be introduced into the lining tube at every point thereof. In this case, the amount of radiation energy depends on the power output of the radiation sources and also the speed at which the latter are guided through the lining tube.

In order to provide radiation energy, use is often made of UV radiation sources, also referred to as UV radiators. The latter are mounted on devices capable of being pulled, so-called light trains, which are pulled through the lines lined with the lining tube by means of cables or traction ropes.

During the operation of UV radiators, and in particular UV low-pressure gas discharge lamps, a number of points should be taken into consideration. Firstly, before start-up, it is necessary for the heating filaments of the UV radiator to be preheated for the purpose of careful treatment, such that electrons already emerge. An ignition voltage in the form of a pulse should then be fed to the UV radiator in order that the ionization can commence and, after a certain time, a luminous gas column can form in the UV radiator in order to generate ultraviolet rays. During operation of the UV radiator, finally, it is absolutely necessary to limit the operating current for the purpose of current limiting in order to avoid destruction of the UV radiator. This is because, on account of the negative characteristic curve of said operating current, a relationship exists between the operating voltage and the operating current such that a smaller operating voltage is assigned to a larger operating current.

In the case of the gas discharge lamps, short-arc lamps, arc lamp, in particular in the form of xenon lamps, often used as a radiation source, a ballast is thus required to enable them to be operated reliably.

It is known to generate the high ignition voltage required for forming the gas column with the aid of an inductance in the form of an inductor which is operated with normal AC voltage at 50 Hz and which brings about the ignition pulse by means of a switching process which in the case of an inductance, as is known, gives rise to a momentarily high voltage. After ignition has taken place, the inductor serves for the required current limiting of the operating current of the UV radiator.

This effect is exploited by conventional ballasts which are series inductors which operate at the power supply system frequency and consist of an iron core with an air gap and a copper or aluminum enamel-insulated wire winding. Adding to the ohmic resistance of the winding (the so-called copper losses) and the magnetization reversal and in the core, losses of approximately 10-20% of the rated lamp power occur. Heat arises in the inductor.

In accordance with the prior art, such conventional ballasts are used for providing power for radiation sources for curing lining tubes and represent the current state of the art.

One problem, besides the poor efficiency when using such conventional ballasts, is that the radiation sources used as radiation sources, in particular in the form of UV lamps, are subjected to natural aging. This aging, which is accompanied by a decrease in the emitted light intensity, depends to a considerable extent on the number of switching cycles which the lamp has undergone. Therefore, it is not possible to make a general statement about the operating period after which the lamp no longer emits the light intensity required for reliable curing.

It is crucial, however, that a sufficient amount of energy is provided by the radiation sources in order to enable reliable curing of the lining tubes.

The prior art also discloses electronic ballasts for high-power radiation sources, although said electronic ballasts are not used in connection with the curing of lining tubes. Such an electronic ballast is also provided with an inductor, but is operated at high frequency of between 20-50 kHz rather than at the power supply system frequency. In this case, the inductor together with a series-connected capacitor and an ignition capacitor connected in parallel with the radiation source form a resonant circuit. The ignition by way of the ignition capacitor takes place when the resonant circuit has built up oscillation to its resonant frequency and the high ignition voltage required has been reached. After the UV radiator has been ignited, the ignition capacitor is virtually inactive, such that the UV radiator is supplied with the operating current via the resonant circuit with the current-limiting inductor. In this case, the electronic ballast operates as an inverter by virtue of a pulsed voltage being applied to the inductor via electronic switches.

However, such electronic ballasts are not actually suitable for a curing device for curing lining tubes. As explained, for curing the lining tubes, use is made of so-called light trains that are pulled through the ducts, which in some instances are hundreds of meters in length. It is thus necessary for the radiation sources to be structurally separated from the ballast, thus necessitating long electrical cable connections of hundreds of meters between the radiation sources and the ballast, wherein these long cable connections cannot be realized in practice owing to the RF feed and primarily owing to the ignition in the case of the radio-frequency electronic ballasts.

What is disadvantageous about the known devices here is that the conventional ballasts currently used do not take account of the real power output of the radiation sources that occur in particular in the context of the aging process. Consequently, it is not currently ensured that the predefined setpoint power of the radiation sources corresponds to the actual power. This has the effect that the quality of the curing process of the lining tubes is not ensured since it is not possible to detect whether a sufficient radiation energy has been provided. Moreover, it is disadvantageous that, depending on the application, use is made of radiation sources having a different power output, each of which radiation sources requires a respectively adapted ballast.

Therefore, the object of the present invention was to overcome the disadvantages of the prior art and in particular to provide a device which makes it possible to regulate the real power output of the radiation energy of the radiation sources, wherein the power output can be selected from a large power spectrum.

This object is achieved by means of a device for curing resin-impregnated lining tubes with high-energy radiation, comprising at least one radiation source for generating high-energy radiation and at least one power control device for regulating the electrical power output to the at least one radiation source, wherein at least one setpoint parameter representative of the desired electrical power consumption by the radiation source is settable or set at the power control device, and the actual power consumed by the at least one radiation source is measured by means of a measuring device and is permanently compared with the setpoint parameter, wherein, in the case where the setpoint parameter is undershot, the power control device increases the power output and, in the case where the setpoint parameter is exceeded, the power output is reduced, and wherein the actual power output of the power control device can deviate from the predefined setpoint parameter, such that the actual power of the radiation source corresponds to the setpoint parameter.

According to the invention, the device for curing lining tubes comprises a power control device instead of a conventional ballast. In contrast to conventional ballasts, the power control device here makes it possible that a setpoint parameter for the power output to the radiation sources can be predefined. It thus becomes possible to tailor the energy feed to the real power consumption of the radiation sources, rather than continuing to employ predefined setpoint values at the ballasts.

This is a great advantage against the background of the above-explained influences on the actual power consumption deviating from the setpoint power consumption. In this case, it may be advantageous, in particular, for the "setpoint power output" of the power control device to deviate from the actual value in order to ensure that the actual power consumption of the radiation sources is attained.

Whereas in conventional ballasts, even with a constant input voltage, the output radiation energy of the radiation sources can vary depending on cable lengths, resistances and the respective aging process of the radiation sources, by virtue of the latter simply drawing less power than necessary, without this being detectable, the power control device according to the invention thus makes it possible to compare the predefined setpoint parameter of the power with the realine actual value of the power consumption and to adjust the actual output to the setpoint parameter. Moreover, the invention prevents varying input voltages on the power supply system side from having a further direct influence on the power output of the radiation sources.

In this case, the measuring device is preferably embodied in the form of a current measuring unit, colloquially also called an ammeter. Such current measuring units are known to the person skilled in the art and can be embodied in analog form as moving-coil measuring mechanisms, moving-iron measuring mechanisms or hot-wire measuring mechanisms.

Moreover, the measuring device can preferably be embodied in the form of a measurement transducer. Measurement transducers are not indicating measuring units, but rather supply a normalized electrical signal for central processing. Said signal can be a standardized signal in terms of analog engineering, e.g. 4 . . . 20 mA. It can also be a digital output signal for communication via a data bus.

Moreover, the measuring device according to the invention can perform a measurement by way of the magnetic field for the current measurement.

Methods and means for forcing the increase in the power output and for reducing the latter in order to adjust the actual value to the setpoint parameter are likewise known to the person skilled in the art and do not need more detailed explanations.

Moreover, it can be advantageous that the setpoint parameter is a parameter representative of a desired power output of the radiation source and is not exclusively or is not a limit value, in particular an upper limit or lower limit of the power output, in order to avoid damage to the radiation source.

Furthermore, it can be advantageous that the power control device is arranged in a manner spatially separated from the radiation source, in particular at a distance of at least 2 meters, wherein the power control device is designed and configured to regulate the actual power output of a radiation source spaced at a distance of up to 200 meters, in particular 500 meters, preferably 1000 meters.

In this case, the device according to the invention is designed and configured to enable a power output in a wide spectrum, such that different radiation sources can be operated by it. In this case, the power output of the power control device is preferably limited at a maximum of 5000 W, preferably at 4000 W, wherein the power output can be set freely up to the maximum power output.

In this case, it can be advantageous according to the invention that the setpoint parameter comprises definable values for the setpoint output voltage, the setpoint output current, the setpoint output power and/or the setpoint output frequency.

All these parameters serve for defining the power output and optimizing the curing process.

Moreover, it can be provided that on the power supply system side, an, in particular three-phase, power supply system voltage of 230V to 530V having a power supply system frequency of 48 Hz to 62 Hz is able to be applied or is applied to the power control device and, on the output side, said power control device provides a voltage of a maximum of 585V, in particular of a maximum of 450V, and an output current of a maximum of 28.5 amperes, in particular of a maximum of 22 amperes.

High radiation energies are necessary for curing the lining tubes. In order to provide the required powers, an, in particular single-phase or three-phase, power supply system voltage of 230V to 530V is applied to the power control device preferably on the input side on the power supply system side.

Since the power supply system frequency is not constant, and is altered by the reactive current components in terms of its frequency which cannot be 100% compensated for by the primary, secondary and tertiary control energy in the interconnected grid, it is particularly advantageous that the power control device according to the invention is designed and configured, in the case of a varying power supply system frequency, reliably to make possible the output-side power output in accordance with the setpoint parameter.

Moreover, it has proved to be particularly advantageous if the output-side voltage outside the ignition process, during which higher voltage can be provided, is up to 585V and the power output is up to 28.5 amperes, in order to provide the desired radiation energy.

Moreover, in accordance with one embodiment, it has proved to be advantageous that the power control device comprises a rectangular and/or trapezoidal inverter and is operated in AC rectangular operation in particular on the output side.

In this case, it can be particularly advantageous that the rectangular and/or trapezoidal inverter is operated in low-frequency AC rectangular operation or AC trapezoidal operation.

As already explained, according to the invention, it may be necessary to provide a high power output for the curing of the lining tubes. In this case, low-frequency operation preferably means a frequency of less than 250 Hz. Such operation enables very gentle operation of the lamp and a very flexible process implementation with complete integration of all required conditions for safe operation in a single arrangement by virtue of the voltage and frequency control of the converter. This also makes it possible to operate different lamp types and powers with the same concept. Scaling of the power classes with standard components is thus provided in a very large range.

In this case, the low-frequency operation additionally prevents losses as a result of longer cables, since the transmission losses are minimized.

In accordance with one embodiment of the present invention, it has proved to be advantageous that the power control device comprises a microcontroller designed and configured to regulate the electrical power output to the at least one radiation source.

In this case, it can be provided, in particular, that the control signals of the microcontroller are embodied such that they are potential-isolated from the power supply system and short-circuit-proof and have, in particular, a near-earth ground.

The use of a microcontroller for regulating technical methods has long been established as worthwhile. In the present case, the power control device is used under more difficult conditions, since they are not simply installed in a switchgear cabinet, but rather are operated in outside use. This has the consequence that it is particularly advantageous to safeguard the microcontroller vis-à-vis disturbance influences from outside.

For this purpose, it is advantageous that the control signals from the microcontroller are embodied such that they are potential-isolated and short-circuit-proof from the power supply system.

Moreover, it has proved to be advantageous that the power control device comprises an ignition unit for pulse bursts having a sinusoidal amplitude of up to 5000V.

The ignition process can be initiated by a separate ignition arrangement or by an additional ignition unit by means of momentary application and superposition of a voltage, boosted relative to the feed voltage, as a voltage pulse with a sufficient voltage-time integral.

The power control device according to the invention with the stated control of the frequency and/or the output voltage of the converter makes it possible to completely dispense with such an additional ignition unit. As a result, the arrangement is greatly simplified and gentle ignition of the lamp is made possible.

In this case, it can be provided that the current-limiting means comprise a series-connected inductor, which further simplifies the construction of the power control device and additionally enables voltage boosting at the lamp for ignition purposes in a simple manner if, for the ignition process, the electronic control in each case increases the frequency and the voltage according to predefined values until the ignition takes place.

The ignition process can easily be monitored preferably by measuring the voltage dip and/or the current rise at the voltage source or in the feed lines or at the converter, or by means of a light sensor. If the ignition is unsuccessful, a further ignition process or a plurality thereof can be initiated automatically, as necessary, until a safe and stable operating state is attained.

The operating power of the radiation source is subsequently regulated, as already explained, in accordance with the setpoint parameter by way of the frequency, for example.

It has proved to be particularly advantageous here that the radiation source used is a gas discharge lamp, a short-arc lamp, a stroboscopic lamp, a flash lamp, an arc lamp, in particular a xenon lamp, and/or a mercury-xenon lamp, wherein in particular wherein the illuminant provides or can provide at least fifty percent (50%) of the radiation energy in a wavelength range of 351 to 800 nm, in particular in a range of 380 nm to 800 nm, in particular in a range of 380 nm to 700 nm, preferably in a range of 390 nm to 470 nm, or in a range of 400 nm to 800 nm.

Moreover, according to the invention, it can be provided that the at least one radiation source is arranged on a transport device comprising wheels, wherein the transport device can be pulled through the line to be renovated by means of a cable, in particular a cable comprising Kevlar fibers and/or at least one traction rope, and/or by means of a traction rope, in order to cure the lining tube.

As described, so-called light trains are used for the curing of lining tubes. Said light trains are preferably pulled through the lining tubes by means of cables or traction ropes, wherein the radiation sources arranged thereon cure the lining tube piece by piece during the traversal of the line to be renovated.

In this case, it can be provided, in particular, that the power control device detects the speed of advance of the transport device and the distance covered and determines, in particular, the position of the transport device in the line to be renovated.

The output radiation energy for curing the lining tube at a location depends not only on the power of the radiation sources, but also on the illumination time. Therefore, it is advantageous to detect the speed of advance of the radiation source.

Moreover, it can be provided that the power control device stores the speed of advance, the position of the transport device in the line to be renovated, and/or the output actual power of the radiation source.

Such a recording of measurement data is particularly advantageous in order to document the correct curing process.

Furthermore, it can be provided that the transport device comprises at least one temperature measuring device, in particular at least one temperature measuring device in each case arranged at the front end, at the rear end and in the center of the transport device, wherein the measurement values of the at least one temperature measuring device are communicated to the power control device.

The temperature measuring devices according to the invention make it possible to detect the temperature in the interior of the lining tube and assist the control or regulation of the curing process.

Moreover, it can be provided that the transport device comprises at least one pressure measuring device in order to measure the pressure in the interior of the lining tube, wherein the measurement values of the at least one pressure measuring device are communicated to the power control device.

As explained, the lining tubes are expanded by means of a pressurized fluid prior to curing. Detecting these values likewise serves for assisting and confirming the curing process.

Finally, it can be provided that the speed of advance of the transport device, the distance covered, the measurement values of the at least one temperature measuring device, the measurement values of the pressure measuring device, the setpoint parameter and/or the actual power output of the at least one radiation source are displayable on a display device and, in particular, storable and printable.

Such displaying and storing, and optional printing, enable the user directly to monitor and log the curing process. In accordance with the prior art, the user is currently provided exclusively with status information about the radiation sources, but not the specific power output thereof. According to the invention, now precisely the actually output power of each of the radiation sources is displayed to the user and logged, with the result that it is directly evident whether the curing process is performed correctly.

Moreover, the present invention provides a method for renovating lines, in particular ducts, shafts, or the like, comprising the following method steps, in particular in this order:

a) providing a device as claimed in any of the preceding claims;

b) predefining a setpoint parameter representative of the desired power consumption of the radiation source at the power control device;

c) permanently detecting the actual value of the power consumption at the radiation source and comparing the actual power consumption with the setpoint parameter by means of the power control device; and in parallel with step c)

d) in the case where the actual power output undershoots the setpoint parameter, the actual power output of the power control device is increased or, in the case where the actual power output exceeds the setpoint parameter, the actual power output of the power control device is reduced; in each case until the actual power output corresponds to the setpoint parameter, wherein the actual power output of the power control device can deviate from the predefined setpoint parameter, such that the actual power of the radiation source corresponds to the setpoint parameter.

In accordance with the method according to the invention, therefore, the setpoint parameters that are input are constantly compared with the real actual powers of the power control device and the actual values are adjusted in a manner corresponding to the setpoint parameter. It is thus possible to ensure that in principle the planned and predefined radiation energy is output, independently of external influences, such as fluctuating power supply system voltages, cable lengths, or aging processes in the radiation sources.

Furthermore, it can be provided that the according to the invention comprises the following steps, in particular in particular before step c):

e) inserting a lining tube into the line, wherein the lining tube comprises at least one layer that is curable and/or cures as a result of an activation, an outer film arranged on the exterior around the curable layer, and a temperature measuring device arranged between the curable layer and the outer film;

f) introducing the device into the lining tube;

g) expanding the lining tube, in particular by means of a fluid, preferably compressed air, such that the lining tube bears against the inner wall of the line;

Finally, it can be provided that the method according to the invention also comprises the following steps, in particular after step g) and in parallel with steps c) and d)

h) propelling the curing device through the line system, wherein the at least one radiation source is or has been activated for the purpose of curing the curable and/or curing layer, wherein the propulsion of the device in the lining tube is regulated depending on the actual power output of the radiation source.

In this case, the invention is based on the surprising insight that, by means of a device according to the invention, it is possible to optimize a curing process in which, instead of merely defining setpoint parameters of the power output of the radiation sources, the actual values are detected and taken into account for regulating the curing process. This is effected, firstly, by virtue of the fact that the actual value can be used for adjusting the correct power output of the radiation sources, and, secondly, by the fact that, in particular, the advance of the radiation sources can be regulated depending on the real power output. By way of example, if it is established that, on account of a deviation of the actual values of the power output of the radiation sources from the setpoint parameter, there is an imminent threat of insufficient energy emission in a section of the lining tube, and the latter is thus possibly not sufficiently cured throughout, firstly the actual power of the radiation sources is increased, and secondly the advance can be reduced.

As a result of the detection of all relevant parameters, in particular the actual power output, the position of the radiation source, the advance thereof, the temperature and the pressure in the lining tube, the curing process itself is comprehensively documented and logged and proof of correct curing can be provided at any time.

However, the invention provides a use of a device according to the invention for regulating the power output of radiation sources for curing lining tubes.

The features of the invention that are disclosed in the above description and the claims may be essential to the realization of the invention in its various embodiments both individually and in any desired combination.

The invention claimed is:
1. A device for curing resin-impregnated lining tubes with high-energy radiation, comprising at least one radiation source for generating high-energy radiation and at least one power control device for regulating the electrical power output to the at least one radiation source, wherein at least one setpoint parameter representative of the desired electrical power consumption by the radiation source is settable or set at the power control device, and the actual power consumed by the at least one radiation source is measured by a measuring device and is permanently compared with the setpoint parameter, wherein, in the case where the setpoint parameter is undershot, the power control device increases the power output and, in the case where the setpoint parameter is exceeded, the power output is reduced, and wherein the actual power output of the power control device can deviate from the predefined setpoint parameter, such that the actual power of the radiation source corresponds to the setpoint parameter.

2. The device according to claim 1, wherein the setpoint parameter comprises definable values for the setpoint output voltage, the setpoint output current, the setpoint output power and/or the setpoint output frequency.

3. The device according to claim 1, wherein the setpoint parameter is a parameter representative of a desired power output of the radiation source and is not exclusively or is not a limit value, in particular an upper limit or lower limit of the power output, in order to avoid damage to the radiation source.

4. The device according to claim 1, wherein the power control device is arranged in a manner spatially separated from the radiation source, in particular at a distance of at least 2 meters, wherein the power control device is designed and configured to regulate the actual power output of a radiation source spaced at a distance of up to 200 meters, in particular 500 meters, preferably 1000 meters.

5. The device according to claim 1, wherein on the power supply system side, a three-phase, power supply system voltage of 300V to 530V having a power supply system frequency of 48 Hz to 62 Hz is able to be applied or is applied to the power control device and, on the output side, said power control device provides a voltage of a maximum of 585V, in particular of a maximum of 450V, and an output current of a maximum of 28.5 amperes, in particular of a maximum of 22 amperes.

6. The device according to claim 1, wherein the power control device comprises a rectangular and/or trapezoidal inverter and is operated in AC rectangular operation in particular on the output side.

7. The device according to claim 6, wherein the rectangular and/or trapezoidal inverter is operated in low-frequency AC rectangular operation or AC trapezoidal operation.

8. The device according to claim 1, wherein the power control device comprises a microcontroller designed and configured to regulate the electrical power output to the at least one radiation source.

9. The device according to claim 8, wherein
the control signals of the microcontroller are embodied such that they are potential-isolated from the power supply system and short-circuit-proof and have, in particular, a near-earth ground.

10. The device according to claim 1, wherein the power control device comprises an ignition unit for pulse bursts having a sinusoidal amplitude of up to 5000V.

11. The device according to claim 1, wherein the radiation source used is a gas discharge lamp, a short-arc lamp, a stroboscopic lamp, a flash lamp, an arc lamp, in particular a xenon lamp, and/or a mercury-xenon lamp, wherein in particular wherein the illuminant provides or can provide at least fifty percent (50%) of the radiation energy in a wavelength range of 351 to 800 nm, in particular in a range of 380 nm to 800 nm, in particular in a range of 380 nm to 700 nm, preferably in a range of 390 nm to 470 nm, or in a range of 400 nm to 800 nm.

12. The device according to claim 11, wherein the at least one radiation source is arranged on a transport device comprising wheels, wherein the transport device can be pulled through the line to be renovated by means of a cable, in particular a cable comprising Kevlar fibers and/or at least one traction rope, and/or by means of a traction rope, in order to cure the lining tube.

13. The device according to claim 12, wherein the power control device detects the speed of advance of the transport device and the distance covered and determines, in particular, the position of the transport device in the line to be renovated.

14. The device according to claim 13, wherein the power control device stores the speed of advance, the position of the transport device in the line to be renovated, and/or the output actual power of the radiation source.

15. The device according to claim 1, wherein the transport device comprises at least one temperature measuring device, in particular at least one temperature measuring device in each case arranged at the front end, at the rear end and in the center of the transport device, wherein the measurement values of the at least one temperature measuring device are communicated to the power control device and are stored, in particular.

16. The device according to claim 12, wherein the transport device comprises at least one pressure measuring device in order to measure the pressure in the interior of the lining tube, wherein the measurement values of the at least one pressure measuring device are communicated to the power control device and are stored, in particular.

17. The device according to claim 12, wherein the speed of advance of the transport device, the distance covered, the measurement values of the at least one temperature measuring device, the measurement values of the pressure measuring device, the setpoint parameter and/or the actual power output of the at least one radiation source are displayable on a display device and, in particular, storable and printable.

18. A method for renovating lines, in particular ducts, shafts, or the like, comprising the following method steps, in particular in this order:
a) providing a device according to claim 1;
b) predefining a setpoint parameter representative of the desired power consumption of the radiation source at the power control device;
c) permanently detecting the actual value of the power consumption at the radiation source and comparing the actual power consumption with the setpoint parameter by means of the power control device; and in parallel with step c)
d) in the case where the actual power output undershoots the setpoint parameter, the actual power output of the power control device is increased or, in the case where the actual power output exceeds the setpoint parameter, the actual power output of the power control device is reduced; in each case until the actual power output corresponds to the setpoint parameter, wherein the actual power output of the power control device can deviate from the predefined setpoint parameter, such that the actual power of the radiation source corresponds to the setpoint parameter.

19. The method as claimed in claim 17, furthermore comprising the following steps, in particular in particular before step c):
   e) inserting a lining tube into the line, wherein the lining tube comprises at least one layer that is curable and/or cures as a result of an activation, an outer film arranged on the exterior around the curable layer, and a temperature measuring device arranged between the curable layer and the outer film;
   f) introducing the device into the lining tube;
   g) expanding the lining tube, in particular by means of a fluid, preferably compressed air, such that the lining tube bears against the inner wall of the line.

20. The method according to claim 18, further comprising the following steps, in particular after step g) and in parallel with steps c) and d)
   h) propelling the curing device through the line system, wherein the at least one radiation source is or has been activated for the purpose of curing the curable and/or curing layer, wherein the propulsion of the device in the lining tube is regulated depending on the actual power output of the radiation source.

* * * * *